Sept. 23, 1958 M. C. APPLEGATE 2,852,993
FILM STRIP FEEDING AND HOLDING DEVICE
Filed March 1, 1955 2 Sheets-Sheet 1
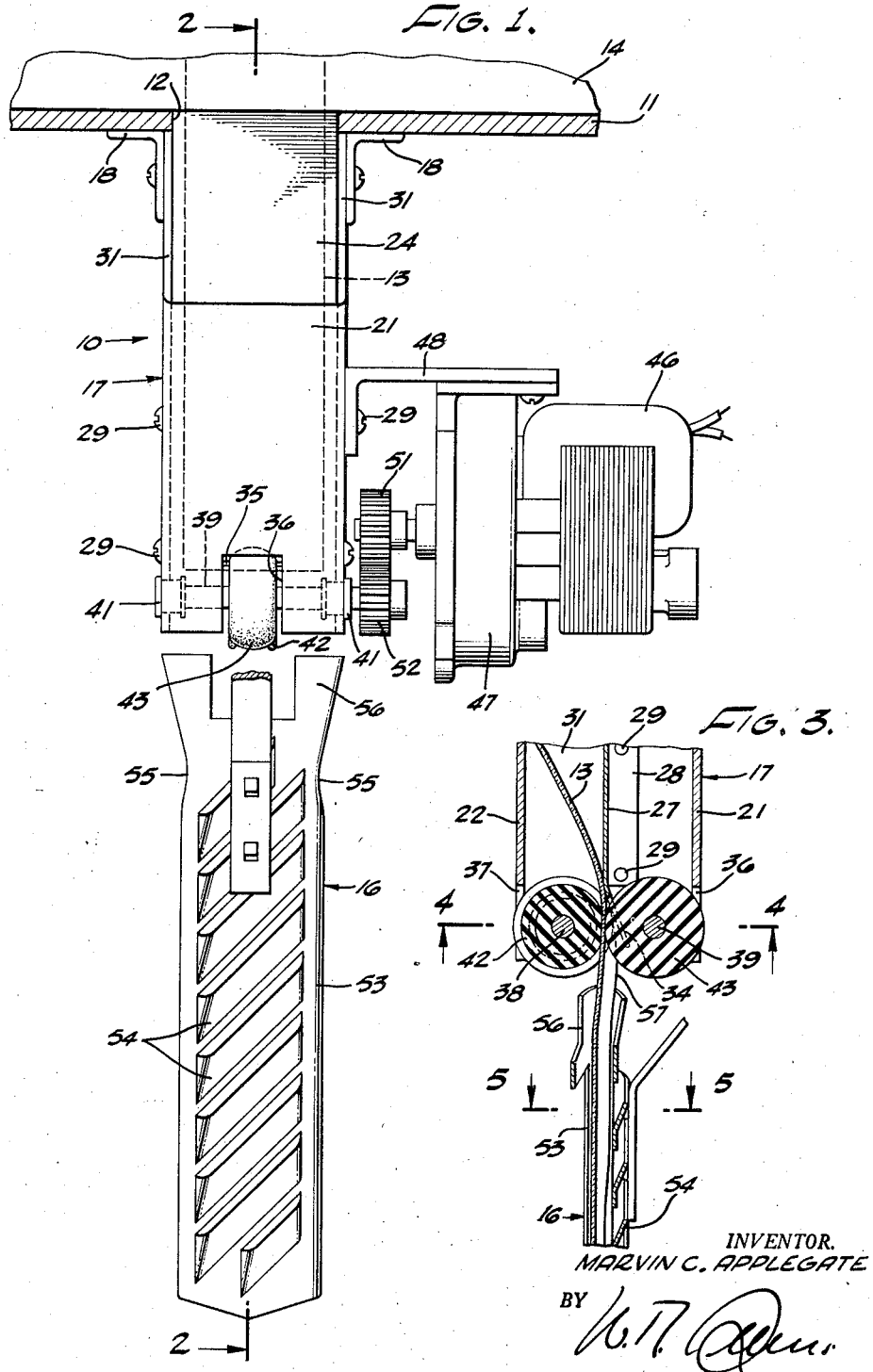
INVENTOR.
MARVIN C. APPLEGATE
BY
ATTORNEY

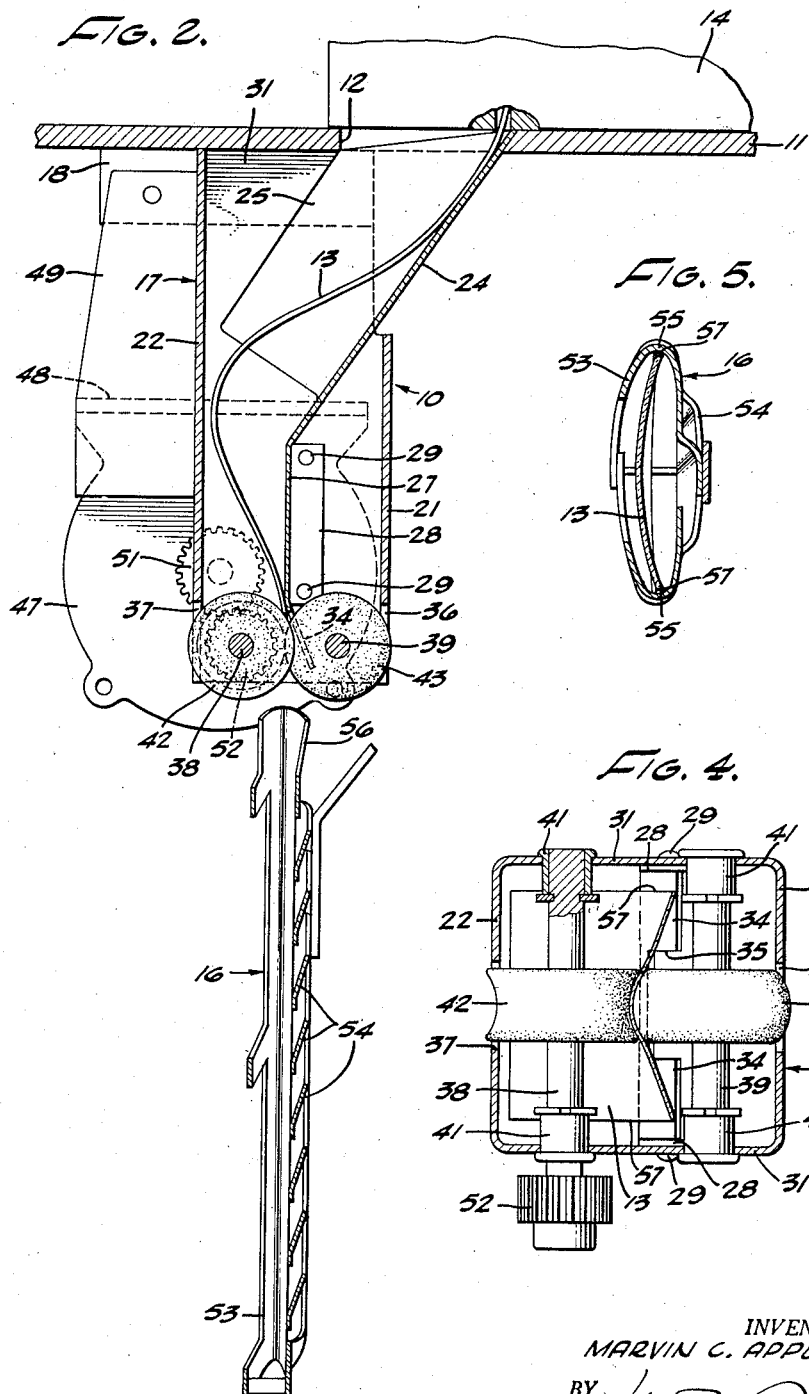

United States Patent Office 2,852,993
Patented Sept. 23, 1958

2,852,993

FILM STRIP FEEDING AND HOLDING DEVICE

Marvin C. Applegate, La Canada, Calif., assignor, by mesne assignments, to Philip S. Allen, Carlsbad, Calif., an individual Application March 1, 1955, Serial No. 491,243

16 Claims. (Cl. 95—14)

This invention relates to a strip conveyor means, and more particularly to an improved film strip feeding device for inserting an exposed film strip into the film carrier portion of an automatic developing apparatus. The invention also relates to an improved film carrier into which the film strip is fed.

In co-pending application Serial Number 468,178, filed November 12, 1954, for an Automatic Photographic Apparatus, there is shown and described an improved coin operated photographic apparatus or studio by which an operator may take a series of pictures of himself on a film strip, and which develops the film strip automatically and delivers it to the operator in a very short period of time. The apparatus described in the cited application constitutes an improvement over the structure shown in Patent 2,541,016, issued February 13, 1951, to Philip S. Allen, in that a number of film strips may be developed simultaneously without resulting in excessive contamination of the various developing chemicals by the chemicals disposed in adjacent tanks or containers. However, in both the device shown in the cited patent application and the device shown in the cited patent, it is necessary to feed a film strip from the camera and into an elongated film carrier or cage, the latter then being dipped sequentially into a plurality of developer and rinse tanks for the purpose of carrying out the automatic developing operation. The present invention relates to an improved form of such means for conveying the film strip from the camera and into the carrier, and also to an improved form of the carrier itself.

In the structures described in the cited patent application and patent, and in similar structures, the exposed film strip was fed from the camera into the carrier in a relatively flat condition and remained in the carrier due to the effect of gravity only. Because the film was fed into the carrier while in a flat condition, it was not sufficiently stiff to prevent buckling of the film in certain instances, with resultant undesirable creasing and scratching thereof. The scratching of the emulsion side of the film has proved particularly troublesome where the carrier is formed with vanes against which the film may rub. Furthermore, and because the film remained in the carrier due to the effect of gravity only, it tended to float or "pump" out of the carrier as the latter was vertically reciprocated in the various developer and rinse solutions, with the result that in certain instances the film became completely separated from its carrier and was therefore lost and spoiled.

In view of the above factors characteristic of film feed-down devices for conveying a film strip from a camera into a film carrier, and of carriers for holding such film strip, it is an object of the present invention to provide a highly simple yet effective device for inserting a film strip into a carrier without possibility of buckling or scratching, and which results in the resilient gripping of the film by the carrier even in the absence of special latching, gripping or locking devices.

A further object of the invention is to provide a film strip engaging means which not only feeds the strip but also causes it to assume a concave or trough-like shape, with the result that its stiffness is increased during feeding and its edges tend to spring into frictional gripping relationship relative to the carrier after feeding.

These and other objects and advantages of the invention will be more fully set forth in the following specification and claims considered in connection with the attached drawings to which they relate.

In the drawings:

Figure 1 is an elevational view of a film strip feed-down unit and carrier embodying the present invention, and illustrating the film carrier disposed to receive the film strip from the feed-down unit;

Figure 2 is a vertical sectional view taken along line 2—2 of Figure 1;

Figure 3 is a sectional view corresponding generally to the central portion of the showing of Figure 2, but illustrating the position and shape of the film strip as it is fed through the rolls and into the carrier;

Figure 4 is a horizontal sectional view taken along line 4—4 of Figure 3 and looking upwardly or in the direction of the arrows; and Figure 5 is a horizontal sectional view of the film carrier, taken along line 5—5 of Figure 3.

Although the improved film conveyor and carrier unit may be employed either with automatic photographic apparatus having a single film carrier (Patent 2,541,016) or a plurality of film carriers, it will be described primarily in connection with the multi-film carrier type covered by patent application Serial Number 468,178, cited above. Similarly to the structure shown in Figure 10 of the drawings of that application, the film feed-down unit 10 may be mounted on the underside of a horizontal shelf or support 11, the latter being apertured at 12 to permit passage of a film strip 13 into the feed-down unit from a camera indicated fragmentarily at 14. Film strip 13, which may contain four exposed pictures, is fed down through aperture 12 by conveyor mechanisms, not shown, in camera 14 and is then severed from the unexposed film roll contained in the camera, all as described in the cited co-pending application. After the film strip 13 is disposed within the feed-down unit, as shown in Figure 2 of the present drawings, it is the function of the feed-down unit to deliver or insert the film into a film carrier 16 disposed therebeneath and registered therewith. Thereafter, the film carrier 16 and contained film strip 13 are immersed sequentially into a plurality of developer and rinse tanks for the purpose of carrying out the automatic developing operation described in the co-pending application.

The film feed-down unit 10 of the invention comprises an elongated vertical casing 17 of rectangular section and which is mounted at its upper end on the underside of shelf 11, preferably by means of the mounting brackets 18 shown in Figures 1 and 2. Casing 17 has spaced parallel inner and outer walls 21 and 22 which lie in planes parallel to the plane in which film strip 13 is disposed when it passes downwardly through the camera 14. Inner wall 21 is cut off at the upper portion of casing 17 so that the casing may receive an inclined chute having a bottom wall 24 and side walls or flanges 25. It may be seen upon reference to Figure 2 that the flanges 25 are angled off at the point where the chute is inserted into the aperture 12 in shelf 11, in order that the chute will provide almost no impedance or resistance to passage of the film strip 13 therethrough and into casing 17.

The bottom wall 24 of the film feed chute is bent vertically downwardly, at its lower end and midway between inner and outer casing walls 21 and 22, to form a vertical baffle or guide 27 which extends downwardly to a point relatively close to the lower casing end. The baffle or guide 27 is provided with side flanges 28 which extend toward wall 21 and are employed as mounting means for the baffle, there being screws 29 extended through the flanges 28 and through the casing side walls 31.

It is emphasized that the vertical baffle 27 defines with the outer casing wall 22 a chamber which communicates with the chamber between the bottom chute wall 24 and casing wall 22, these chambers being the ones through which film strip 13 passes after leaving camera 14.

The lower edge of the vertical baffle or guide 27 is formed integral with a pair of guide ears or members 34 which incline downwardly and toward inner wall 21, and extend substantially to the extreme lower casing end. It will be seen upon reference to Figure 4 that the guide ears 34 are spaced apart a substantial distance to form an opening or notch 35 therebetween. Notch 35 is centrally located and is in line with centrally located notches or openings 36 and 37 provided, respectively, in the lower ends of inner and outer casing walls 21 and 22.

A pair of roll mounting shafts 38 and 39 are journaled in spaced parallel relation and in a horizontal plane at the lower end of casing 17, preferably by means of bushings 41 provided in apertures in the casing side walls 31 as best shown in Figure 4. Mounted centrally of the respective shafts 38 and 39 are rolls 42 and 43, preferably formed of resilient material such as rubber, and which extend through the various notches or openings 35, 36 and 37. The roll 42, which is fixedly mounted on shaft 38 relatively adjacent outer casing wall 22, has a concave or dished peripheral edge portion. Conversely, the roll 43 on shaft 39 adjacent inner casing wall 21 has a convex or protruding peripheral edge portion. The peripheral edge of roll 43 is complementary to and extends into the peripheral edge of roll 42, and at a point generally in the plane of the vertical baffle or guide 27 as illustrated in Figures 2 and 3.

In order to drive the shaft 38 and associated roll 42, and thus to drive the roll 43, an electric motor 46 having a connected gear train within a casing 47 is mounted on a horizontal bracket 48 provided on casing side wall 31. The bracket 48 is also mounted on a mounting plate 49 (Figure 2) which extends upwardly and connects to one of the brackets 18 previously described. The gearing within casing 47 is connected to a gear 51 which meshes with a gear 52 keyed on the shaft 38, so that the motor may operate through the various gearing to drive the shaft 38 and thus rolls 42 and 43.

The film strip carrier 16 is, with a very important exception to be described below, of the improved vaned type illustrated in the cited application Serial Number 468,178, which is similar to that described in detail in the cited patent, Number 2,541,016. As is there indicated, the carrier has an elongated vertical casing 53 with an open upper end through which film strip 13 is inserted. Vanes 54 are formed along one wall of casing 53, relatively adjacent wall 21, to provide an agitation action when the carrier is vertically reciprocated in a developer or rinse solution.

The carrier casing 53 and the chamber defined thereby are generally oval in section, as best shown in Figure 5. According to the invention, the upper portion of casing 53 is formed with a neck 55 which has a major diameter slightly less than the width of film strip 13, so that the latter may not be inserted therethrough unless it is in a bent or troughed condition. The major diameter of the remainder of carrier casing 53, other than at neck 55, is preferably slightly greater than the film strip width. Furthermore, the upper end of the casing is formed as a receiving mouth 56 which flares outwardly to a major diameter substantially greater than the film width.

In the operation of the film feed-down device 10 and film carrier 16, let it be assumed that four pictures have been exposed on film strip 13, and that the conveyor mechanism within camera 14 has fed the film through aperture 12 and down the chute defined by wall 24 and side flanges 25. The lower end of the film strip is then disposed in the chamber defined by baffle 27 and outer wall 22. The film strip 13 rests in the position shown in Figure 2, the upper end thereof having been cut off by the cut-off mechanism within camera 14, until a carrier 16 is registered with the feed-down unit and automatic control means are operated to energize the motor 46. Such automatic control means are described in detail in the co-pending application Serial Number 468,178.

Because of the location of the outer peripheral portion of feed roll 42 within the opening or notch 37 in outer casing wall 22, it is assured that operation of motor 46 to drive roll 42 clockwise, as viewed in Figures 2 and 3, will move the lower end of film strip 13 to the illustrated point at the lower edge of vertical baffle 27. Continued clockwise rotation of feed roll 42, with resultant counterclockwise rotation of feed roll 43, then operates to draw the lower edge of film strip 13 downwardly between the feed rolls so that it is caused to assume the trough-like or concave configuration illustrated best in Figure 4. In this connection it is emphasized that the edges 57 of the film strip are bent into engagement with the inclined guide ears 34, which serves as an additional control for the degree of bending or troughing. Preferably, the film strip 13 is troughed in a direction such that the emulsion side thereof, which is on the right surface of the film strip as viewed in Figures 2 and 3, and relatively adjacent wall 21, will be on the inner or concave side of the strip.

Continued driving of the rolls 42 and 43 by motor 46 effects feeding of the film strip 13 downwardly into the carrier 16 registered therewith, all as illustrated in Figure 3. The bowing or troughing of the film strip, resulting from passage thereof between the cooperating feed rolls, serves to stiffen the portion of the film strip passing into carrier 16, with the result that there is a greatly lessened tendency toward buckling of the film. Also, the troughing of the film strip reduces the straight line distance between its edges 57 to an amount which is less than the major diameter of the carrier at neck 55. The insertion of the film strip into carrier 16 is therefore facilitated and is substantially without rubbing between the edges 57 and carrier casing at neck 55.

As soon as the film strip has been fully inserted into the carrier 16, and has passed completely through the rolls 42 and 43, it tends to spring back to its natural relatively flat condition, and this results in the resilient pressing of the film edges 57 into internal contact with carrier neck portion 55. A locking or binding action thus results which resists longitudinal shifting of the film strip 13 relative to carrier 16. It follows that it will be substantially impossible for the film strip to float or pump out of carrier 16 as the latter is immersed and vertically reciprocated in the various developer and rinse tanks.

In addition to the above, and very importantly, the emulsion side of film strip 13 is always maintained bent or bowed away from vanes 54, so that there is no possibility of rubbing therebetween and consequent scratching of the film. However, the emulsion side of the film faces the vanes so as to receive full benefit of the agitation and improved developing action effected by the vanes.

After completion of the developing operation, the carrier 16 containing the developed film strip 13 becomes registered with a film delivery unit adapted to withdraw the film strip from the carrier and deliver it to the customer. Such withdrawal or delivery unit may be conventional, and may be of the type illustrated in Figure 22 of co-pending application Serial Number 468,178.

While the particular device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a device for inserting a film into a film carrier mechanically without the assistance of an operator, a pair of cooperating feed rolls having mating peripheral edge portions for receiving exposed film from a camera, the peripheral edge portion of one of said rolls being grooved, the peripheral edge portion of the other of said rolls being protuberant and extending into the grooved peripheral edge portion of said one roll, said rolls being adapted to receive said exposed film therebetween to bend the same into a concave or trough-like configuration prior to and during insertion thereof into a film carrier.

2. The invention as claimed in claim 1, in which means are provided to drive at least one of said rolls.

3. A film carrier member adapted to receive an exposed film strip from a mechanical film feeding unit aligned with the open end of said film carrier and carry the same between and into developing tanks during a developing operation, which comprises an elongated casing shaped to define an elongated chamber and having an open end through which a film strip may be inserted into said chamber, said casing being formed with neck means adjacent said open end to reduce the diameter of said chamber at said neck means to an amount less than the width of said film strip, said neck means operating to maintain said film strip in a concave or trough-like shape to thereby increase the stiffness thereof and to effect binding or locking thereof with said neck means.

4. The invention as claimed in claim 3, in which said carrier is formed with vane means to effect agitation of a developed liquid into effective developing contact with said film strip during movement of said carrier through said developer liquid.

5. In an automatic photographic apparatus, in combination; an elongated open-ended film strip carrier shaped to receive an elongated exposed film strip, said film strip carrier having, at least at one point along its length, an inner width less than the flat width of said film strip so that said film strip at said point must assume a concave or trough-like shape; and a power driven film feed unit to insert said film strip into said carrier, said feed unit including means for holding said film strip in said concave or trough-like shape as said film feed unit advances the film into said carrier.

6. The invention as claimed in claim 5, in which said one point along the length of said carrier is adjacent said film feed unit during feeding of said film strip into said carrier.

7. The invention as claimed in claim 5, in which the last-named means includes a first feed roll having a convex peripheral edge and a second feed roll having a concave peripheral edge which receives said convex peripheral edge, said peripheral edges cooperating to cause said film strip to assume said concave or trough-like shape.

8. In combination in an automatic photographic apparatus adapted to expose and develop a film strip; a feed-down unit including a casing, a pair of feed rolls journaled at the lower end of said casing and having mating peripheral edge portions one of which is convex and the other concave, and means to drive said feed rolls to effect concurrent feeding of said film strip therebetween and bending said film strip into a trough-like shape lengthwise thereof to reduce the distance between it opposite edges; and a film carrier unit disposed adjacent said feed-down unit to receive said trough-shaped film strip therefrom, said carrier unit including an open-ended elongated casing which, at its end portion adjacent said feed-down unit, has a smaller internal dimension than the width of said film strip when flat so that said film strip must remain in trough-like shape while in said carrier unit.

9. The invention as claimed in claim 8, in which one wall of said carrier is formed with vanes adapted to effect agitation of a liquid into which said carrier is immersed, and in which said carrier and feed rolls are so disposed relative to each other and to said film strip that the emulsion side of the latter is bent away from said vanes during and after insertion of said film strip into said carrier.

10. The invention as claimed in claim 8, in which said feed-down unit also includes chute and guide means to guide said film strip into and through said feed rolls and into the open end of said carrier.

11. A film strip feed-down unit, which comprises a vertically disposed generally rectangular casing having an opening through the upper portion of one of its walls, a pair of shafts journaled in a horizontal plane and in the lower end of said casing, said shafts being parallel to each other and to said one wall, means to rotate at least one of said shafts, first and second feed rolls mounted one on each of said shafts, said rolls having mating peripheral edge portions one of which is convex and the other concave, a film chute extending downwardly at an angle through said opening, and a vertical baffle extending downwardly from the lower portion of said chute to a point generally between said rolls adapted to guide the lower end of a film strip between said feed rolls.

12. The invention as claimed in claim 11, in which guide ear means are provided on the lower end of said baffle and on opposite sides of said rolls, said guide ear means inclining downwardly and generally toward the shaft on which said convex feed roll is mounted.

13. The invention as claimed in claim 11, in which the portion of said feed rolls remote from each other are disposed in openings in the walls of said casing.

14. In an automatic photo studio apparatus of the type with a camera having an exposed film discharge aperture opening into a film developing chamber; that improvement which comprises an exposed film receiving chute in communication with said film discharge aperture for said camera, power-driven film feeding mechanism associated with said chute for feeding the film into a film developing carrier, a film carrier having an open end positioned to receive film advancing from said feeding mechanism, means for deforming said film strip into concave form transversely thereof as it is fed into said carrier, and means for holding said film in said concave form while in said carrier with its emulsion-coated surface out of contact with the juxtaposed interior surfaces of said carrier.

15. In an automatic photo studio apparatus of the type with a camera having an exposed film discharge aperture opening into a film developing chamber; that improvement which comprises an exposed film receiving chute in communication with said film discharge aperture for said camera, power-driven film feeding mechanism associated with said chute for feeding the film into a film developing carrier, an elongated film carrier having an open end and being generally oval shape in cross section, the width of said carrier being less than the flat width of a film strip, means associated with said film feeding mechanism for bending the same crosswise thereof to bring its opposite lateral edges closer together as said film is advanced into said open end of said film carrier, said carrier being adapted to hold said film curved crosswise thereof while positioned in the carrier thereby greatly strengthening said film and preventing the emulsion-coated surface thereof from contacting said carrier while being agitated in developing solutions.

16. That improvement in film carriers for use in automatic photo studio apparatus of the type receiving exposed film directly from a camera and developing the same within the studio apparatus, said carrier comprising an elongated thin-walled housing having a film receiving opening adjacent one end and an interior transverse width less than the flat width of a film strip, said housing having a plurality of openings in one wall thereof for the free flow therethrough of developing fluids, and said carrier having neck means intermediate its opposite ends restricting the width thereof to a greater extent than the remainder of said carrier and effective to hold a film strip in concave shape crosswise thereof for the full length of the strip by contact with a relatively short section of the opposite lateral edges thereof thereby minimizing the area of friction between said strip and carrier as the film is inserted and withdrawn.

References Cited in the file of this patent

UNITED STATES PATENTS

| | | |
|---|---|---|
| 1,232,900 | Dickson | July 10, 1917 |
| 2,371,073 | Smith | Mar. 6, 1945 |
| 2,458,699 | Ginsberg | Jan. 11, 1949 |
| 2,544,644 | Allen | Mar. 13, 1951 |
| 2,647,449 | Wolf | Aug. 4, 1953 |

FOREIGN PATENTS

| | | |
|---|---|---|
| 23,973 | Great Britain | Oct. 30, 1907 |
| 26,820 | Great Britain | Nov. 22, 1912 |
| 743,072 | France | Jan. 6, 1933 |